UNITED STATES PATENT OFFICE.

THOMAS McLOUGHLIN, OF JUDSONVILLE, CALIFORNIA.

GRAFTING-WAX.

SPECIFICATION forming part of Letters Patent No. 266,858, dated October 31, 1882.

Application filed August 15, 1882. (No specimens.)

*To all whom it may concern:*

Be it known that I, THOMAS McLOUGHLIN, of Judsonville, Contra Costa county, State of California, have invented a new and useful composition of matter to be used in grafting, which I call "Grafting-Wax," of which the following is a specification.

My composition or grafting-wax consists of the following ingredients, combined in the proportions stated: black pitch, two pounds; resin, two pounds; pine-pitch, two pounds; honey, one-fourth pound; tallow, one-fourth pound; beeswax, one-half pound. To make the composition I first take the black pitch, resin, pine-pitch, and beeswax, and melt them together in a pot. I then add the honey and tallow and stir the mass until all the ingredients are thoroughly mixed.

In using this wax it is applied while in its liquid state, by means of a brush, to the graft. When cool it becomes hardened upon the graft.

In grafting the scion is tied to its place on the stock by means of a cloth bandage, and the wax used is put over and around the bandage.

There are two main requirements in the use and formation of all grafting-wax. First, it must, when applied to the cut, completely exclude the air; second, it must be weather-proof to resist the action of the sun and rain. I am aware that a composition is in general use for this purpose in which the ingredients are beeswax, resin, and tallow, combined in various proportions. This composition serves the purpose very well; but I have found by experiment that by adding black pitch, honey, and pine-pitch to these ingredients, all in the proportions given, I obtain a better wax, more economical because of the increase in bulk caused by cheap materials, and more efficient because of greater durability. The black pitch is the ordinary pitch of commerce, and its presence adds to the bulk, makes the composition stiffer when cooled, and renders it more durable and better adapted to withstand the elements. The honey makes it more homogeneous, and the pine-pitch, which I gather fresh from the trees, adds its turpentine to render it more capable of being molded or pressed around the graft. The action of the other ingredients is well known, and needs no further explanation.

The composition may be preserved indefinitely, and when about to be used has but to be melted again. When around the graft and hardened by cooling it makes an air-tight covering and will not soften in the heat of the sun, nor be beaten off or dissolved by the rain. It is clean to handle, is not sticky, and may be packed in cans or boxes to an advantage.

I am aware that compositions closely allied to mine in general characteristics have heretofore been made, and hence I confine myself to the precise composition of matter described.

Having thus described my invention, what I claim as new, and desire to secure by Letters Patent, is—

The herein-described composition of matter or grafting-wax, consisting of black pitch, resin, pine-pitch, honey, tallow, and beeswax, in the proportions substantially as specified.

In witness whereof I hereunto set my hand.

THOMAS McLOUGHLIN.

Witnesses:
 W. MAHAN,
 AMOS WILSON.